(12) United States Patent
Taverner et al.

(10) Patent No.: US 8,552,360 B2
(45) Date of Patent: Oct. 8, 2013

(54) WAVELENGTH SWEEP CONTROL

(75) Inventors: Domino Taverner, Farmington, CT (US); Trevor MacDougall, Simsbury, CT (US); Paul E. Sanders, Madison, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 58 days.

(21) Appl. No.: 11/755,131

(22) Filed: May 30, 2007

(65) Prior Publication Data

US 2007/0280703 A1 Dec. 6, 2007

Related U.S. Application Data

(60) Provisional application No. 60/803,470, filed on May 30, 2006.

(51) Int. Cl.
*G01N 21/25* (2006.01)

(52) U.S. Cl.
USPC .................................. 250/227.23

(58) Field of Classification Search
USPC ............ 359/572; 385/37, 12–13; 398/28–33; 356/478; 250/227.14, 226, 227.21, 250/227.23
See application file for complete search history.

(56) References Cited

U.S. PATENT DOCUMENTS

| | | | |
|---|---|---|---|
| 6,449,047 B1* | 9/2002 | Bao et al. ....................... | 356/478 |
| 7,414,779 B2* | 8/2008 | Huber et al. .................. | 359/333 |
| 2004/0196177 A1* | 10/2004 | Billington et al. ............ | 342/174 |
| 2004/0245441 A1* | 12/2004 | Pieterse et al. ........... | 250/227.14 |
| 2005/0035278 A1* | 2/2005 | Margalit et al. ........... | 250/227.14 |
| 2005/0058457 A1* | 3/2005 | MacDougall et al. ........ | 398/149 |
| 2005/0173623 A1* | 8/2005 | Shin et al. ................. | 250/227.18 |
| 2005/0226550 A1* | 10/2005 | Miyata et al. ................... | 385/16 |
| 2005/0230607 A1* | 10/2005 | Nebendahl ............... | 250/227.14 |
| 2006/0076476 A1* | 4/2006 | Thingbo et al. .......... | 250/227.23 |

* cited by examiner

*Primary Examiner* — Alessandro Amari
*Assistant Examiner* — Kimberly N Kakalec
(74) *Attorney, Agent, or Firm* — Patterson & Sheridan, LLP

(57) ABSTRACT

Methods and apparatus for the active control of a wavelength-swept light source used to interrogate optical elements having characteristic wavelengths distributed across a wavelength range are provided.

8 Claims, 8 Drawing Sheets

WAVELENGTH SWEEP CONTROL

CROSS-REFERENCE TO RELATED APPLICATIONS

This application claims benefit of U.S. Provisional Patent Application Ser. No. 60/803,470, filed May 30, 2006, which is herein incorporated by reference.

BACKGROUND OF THE INVENTION

1. Field of the Invention

Embodiments of the present invention generally relate to determination of a characteristic wavelength of an optical component and, more particularly, to techniques and apparatus for controlling the manner in which a spectral bandwidth is swept in an effort to determine the characteristic wavelength.

2. Description of the Related Art

Many optical components have a characteristic wavelength that may be found by interrogating the optical component with an optical source capable of producing light at various wavelengths over a fixed range or bandwidth. For example, Bragg gratings (typically formed by photo-induced periodic modulation of the refractive index of an optical waveguide core) are highly reflective to light having wavelengths within a narrow bandwidth centered at a wavelength generally referred to as the Bragg wavelength. Because light having wavelengths outside this narrow bandwidth is passed without reflection, Bragg wavelengths can be determined by interrogating a Bragg grating with a light source swept across a bandwidth that includes the Bragg wavelength and monitoring the reflected optical power spectrum at a receiver unit. Because Bragg wavelengths are dependent on physical parameters, such as temperature and strain, Bragg gratings can be utilized in optical sensor systems to measure such parameters.

In these and a wide range of other types of optical systems, the measurement of a characteristic wavelength of an optical component to great accuracy (and/or with great repeatability) is important to system performance. Two significant parameters determining the error of any such measurement are the signal to noise ratio (SNR) and effective interrogation time of the measuring system. SNR is dependent of many factors including received optical power, optical-source noise, and receiver noise. The effective interrogation time is dependent on overall averaging time and the proportion of that time which is producing useful signals at the receiver unit. Improving these two parameters can improve characteristic wavelength measurement repeatability and accuracy.

In a typical system, with a fixed spectral bandwidth sweep, a large percentage of the interrogation time is spent covering wavelengths where no useful signal is returned by the optical element under test. This may be particularly true in the case where multiple elements (e.g., multiple Bragg gratings disposed serially on a common fiber) are combined in a commonly used wavelength-division multiplexing (WDM) scheme. In these arrangements, wavelength guard-bands are typically required between the spectral features of elements, for example, to ensure the elements have non-overlapping spectral features over the entire expected measurement range and even as some movement in the spectral features may be expected over time. These guard-bands increase the total range of wavelengths scanned, thereby increasing the amount of interrogation time spent covering wavelengths that produce no useful signal.

Accordingly, techniques and systems that optimize the useful received signal, reduce SNR, and reduce the total amount of interrogation time would be desirable.

SUMMARY OF THE INVENTION

Embodiments of the present invention generally provide methods and apparatus for interrogating sensors elements having characteristic wavelengths spread across a wavelength range.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention provide for the active control of a light source used to interrogate optical elements having characteristic wavelengths distributed across a wavelength range.

For some embodiments, this active control may include varying sweep rates across different ranges. For example, a sweep rate may be reduced in ranges containing spectral features of interest, allowing more measurements which may lead to increased resolution. On the other hand, the sweep rate may also be increased in order to skip, or otherwise move rapidly through, other ranges (e.g., ranges absent features of interest or ranges corresponding to measured parameters that do not require as high resolution as others or as frequent measurements). Further, for some embodiments, particular ranges (sweep bands) may be adjusted, for example, to follow features of interest as they shift (e.g., change in wavelength) over time.

Different embodiments of the present invention may utilize wavelength sweep control described herein in systems utilizing transmissive or reflective type sensors. Further, embodiments of the present invention may be applied in a number of different sensing applications, including, but not limited to, industrial applications, downhole applications (e.g., in wellbore sensing applications), and subsea applications (e.g., ocean bottom seismic sensing applications).

An Exemplary System

Figure 1A:
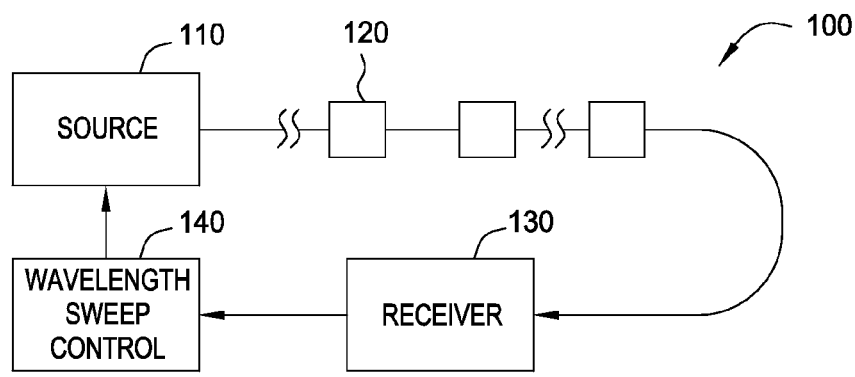
FIG. 1A illustrates an exemplary transmissive optical sensor system with wavelength sweep control.

FIG. 1A illustrates an exemplary optical sensor system 100 utilizing wavelength sweep control in accordance with one embodiment of the present invention. As illustrated, the system 100 may include a swept-wavelength optical source 110, one or more transmissive optical elements 120 having one or more spectral features of interest (e.g., a characteristic wavelength), and a sweep control unit 140.

The swept-wavelength optical source 110 produces optical radiation at wavelengths and over wavelength ranges (bandwidths) under the control or influence of the sweep control unit 140. The elements 120 may be interrogated with optical radiation from the optical source 110 that is swept across a spectral range including the spectral features of interest. The elements 120 may be sensitive to parameters (e.g., temperatures, pressures and strain) that effect the attenuation of particular wavelengths of light transmitted through the elements 120 in a known manner.

Figure 2:
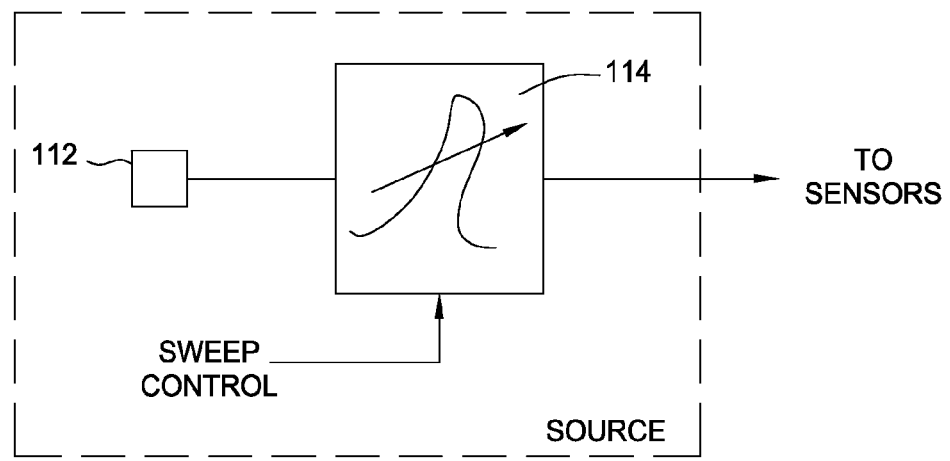
FIG. 2 illustrates an exemplary wavelength sweeping optical source utilizing a tunable filter.

As illustrated in FIG. 2, one embodiment of the optical source 110 may include a broadband source 112 and a tunable filter 114 that may be controlled by the sweep control unit 140. For example, the sweep control unit 140 may control the tunable filter 114 to adjust a wavelength range (or band) to pass with little or no attenuation while blocking wavelengths outside the range. For other embodiments, the optical source 110 may include a light source that can be controlled to generate optical signals of different wavelengths, such as a tunable laser.

Referring back to FIG. 1A, a receiver 130 may include any suitable combination of optical, opto-electronic, and electronic components to process light signals transmitted through the elements 120. Thus, the receiver 130 may be able to generate information about the corresponding parameters, based on the spectral information extracted from the received light. The receiver 130 may include any suitable combination of components that converts optical signals to electrical signals, integrates, filters and produces characteristic wavelength determinations. As an example, for one embodiment, the receiver may include an optical PIN diode, transimpedance amplifier, analog filter, analog-to-digital converter, digital filter and processing unit (e.g., an embedded processor, industrial or personal computer) for wavelength determination.

Figure 3:
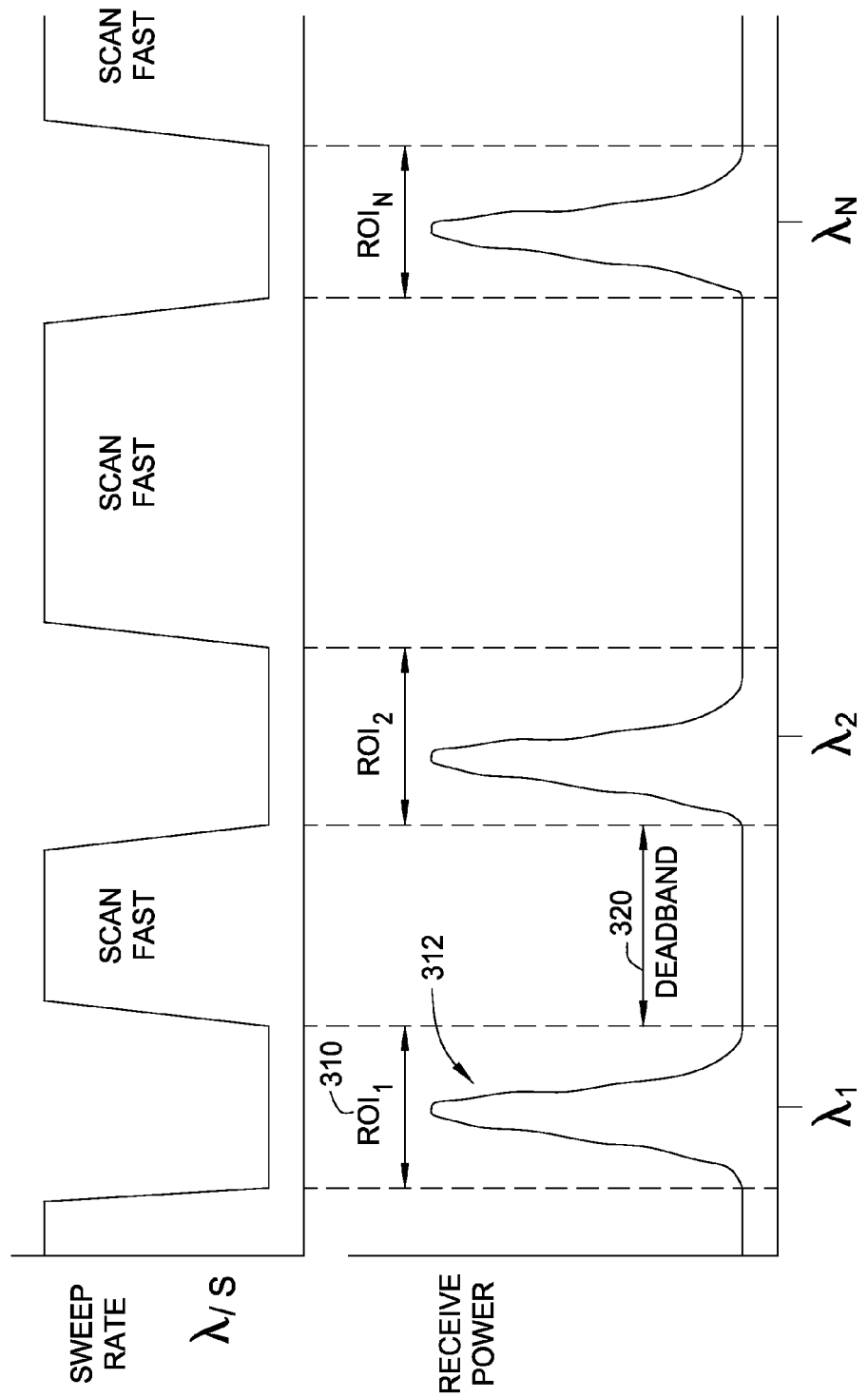
FIG. 3 illustrates how sweep rates may be varied for different wavelength regions of interest in accordance with embodiments of the present invention.

As illustrated, the sweep control unit 140 may receive, as input, one or more signals from one or more points in the receiver 130 and, in response, may output signals that influence the sweep of the optical source 110. Examples of typical parameters that the sweep control unit may influence include, but are not limited to, source wavelength, source wavelength sweep range, sweep rate, and/or source optical output power. These influences may include discontinuous or continuous changes in such parameters, for example, multiple sweep bands (FIG. 3). The sweep control unit signals can influence a sweep as it is in progress and/or influence future sweeps, as will be described in greater detail below.

The sweep control unit 140 may be implemented using any suitable processing logic, such as an embedded controller, a programmable logic controller (PLC) or personal computer (PC). While shown as a separate component in the Figures, for some embodiments, the sweep control unit 140 may be integrated into, or be an integral function of the receiver 130, source 110, and/or both.

Figure 1B:
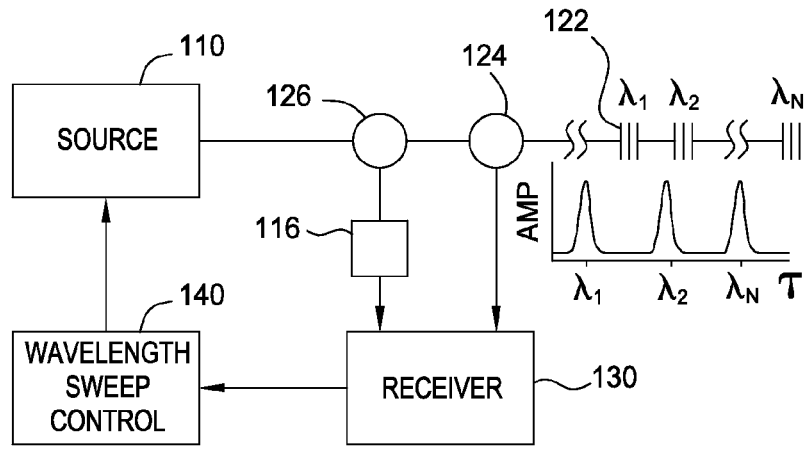
FIG. 1B illustrates an exemplary reflective optical sensor system with wavelength sweep control.

As illustrated in FIG. 1B, similar techniques may be applied to a system utilizing reflective sensor elements 122, such as Bragg gratings, with the spectral feature of the light reflected dependent upon a sensed parameter. Each Bragg grating 122 may be interrogated by sweeping across a corresponding wavelength range chosen to contain the characteristic wavelength $\lambda$, accounting for the maximum deviations in center wavelengths (areas of peak reflection) expected over the entire range of measured parameters and over time. During this interrogation, response signals are monitored by the receiver 130 in order to make characteristic wavelength determinations.

Interrogating optical signals from the source 110 may be directed to the gratings 122 via a bi-direction coupler 124 that also directs reflected response signals to the receiver 130. A splitter 126 may also direct a portion of the interrogating optical signals to a reference element 116, allowing the receiver 130 to monitor optical signals produced by the optical source 120 (e.g., the actual wavelength and power).

As previously described, wavelength division multiplexed (WDM) systems, such as the system 100 typically have deadbands between sensor wavelengths, to ensure non-overlapping characteristic wavelengths. In conventional systems, these deadbands add to the total swept wavelength range, thereby increasing overall interrogation time and decreasing the percentage of this time a useful response signal is produced. However, embodiments of the present invention may increase the percentage of time spent producing useful response signals by skipping these deadbands or at least increasing the sweep rate to rapidly sweep through them.

Varying Sweep Rates

FIG. 3 illustrates an exemplary spectral response for a system (power of received response signals versus wavelength), with multiple swept ranges 310 containing spectral features of interest 312. As illustrated, regions of interest may be scanned with a first (relatively slow) scan rate, while deadbands 320 may be scanned with a second (relatively faster) scan rate or skipped altogether. For some embodiments, for example, due to limited response time of the source 110 (e.g., due to physical, mechanical, or electrical limitations), it may not be possible to entirely skip a wavelength range and therefore deadbands may be swept with increased sweep rate (relative to the ranges of interest 310).

In either case, controlling the sweep rate in this manner may increase the useful optical energy received from the optical elements in a given interrogation time. As a result, overall interrogation time may be reduced relative to conventional systems or, alternatively, more measurements may be taken in the same interrogation time, allowing an increased "focus" on ranges of interest which may increase accuracy.

Different sweep rates may also be utilized for different ranges of interest, to interrogate different sensors at different rates, which may provide a great deal of flexibility in overall system design. For example, a first sensor (e.g., having a first characteristic wavelength $\lambda 1$) may be interrogated using a lower sweep rate than that used to interrogate a second sensor (λ2). As a result, more measurements may be taken for the first sensor, which may be lead to higher accuracy measurements, while the second sensor may be used for more coarse measurements. Using this approach, some sensors may be designated as "high resolution" sensors and interrogated with lower sweep rates (sampled more often) than other sensors.

At a different point in time, it may become desirable to take higher accuracy measurements of the second sensor. Therefore, the sweep rates of different sensors may be changed from one sweep to the next. For example, for some applications, it may only be necessary to take highly accurate measurements of certain parameters in certain situations (e.g., when the parameter is changing rapidly, or has reached a particular threshold value). In some instances, high accuracy measurements (low sweep rate) of a particular parameter may only be made when a coarse measurement of the same parameter (taken in a current or previous sweep) indicates a particular value or range.

Figure 4:
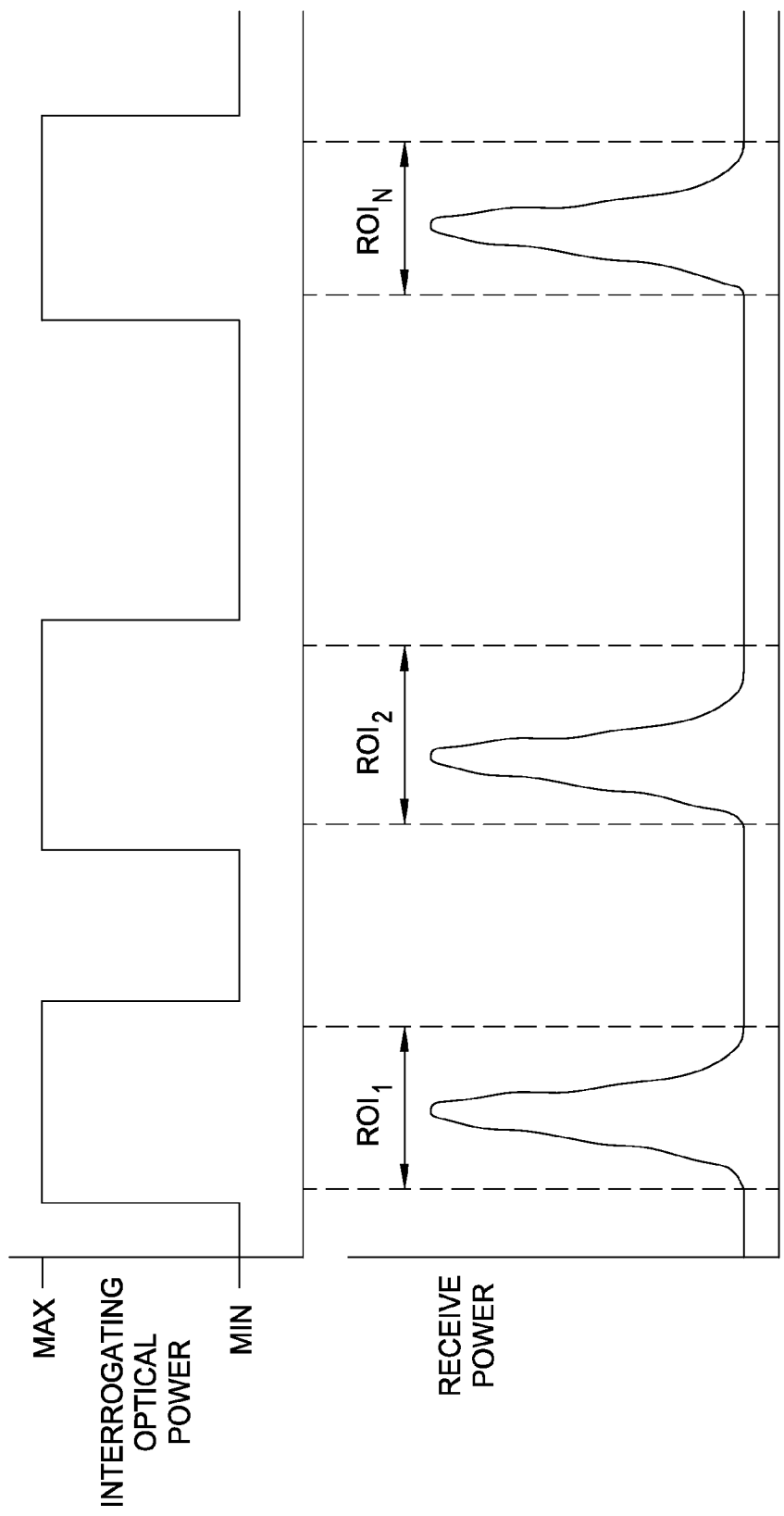
FIG. 4 illustrates how optical power may be varied for different wavelength regions of interest in accordance with embodiments of the present invention.

As illustrated in FIG. 4, for some embodiments, the optical power of interrogating light signals may also be varied for different swept ranges (as an alternative to, or in conjunction with, varying sweep rates). For example, optical power may be decreased when sweeping across dead ranges. This approach may allow optical power to be conserved. For some embodiments, reduced optical power may be used to scan particular swept ranges, until a particular threshold level of optical response signal is received.

Changes in the received power from the optical element (or optical system) could also be compensated for, by adjusting the source output power for example. As will be described in greater detail below, with reference to FIG. 9, monitoring response signals while quickly sweeping and/or interrogating with lowered optical power over particular swept ranges may be performed as part of a process to automatically "discover" a particular sensor topology.

Adjusting Ranges of Interest

Embodiments of the present invention may also allow for only a limited band of wavelengths directly surrounding particular spectral features of interest to be swept by the source. The wavelength sweep control unit may continuously adjust the swept bands/ranges to track these features, should they change in wavelength over time.

Figure 5:
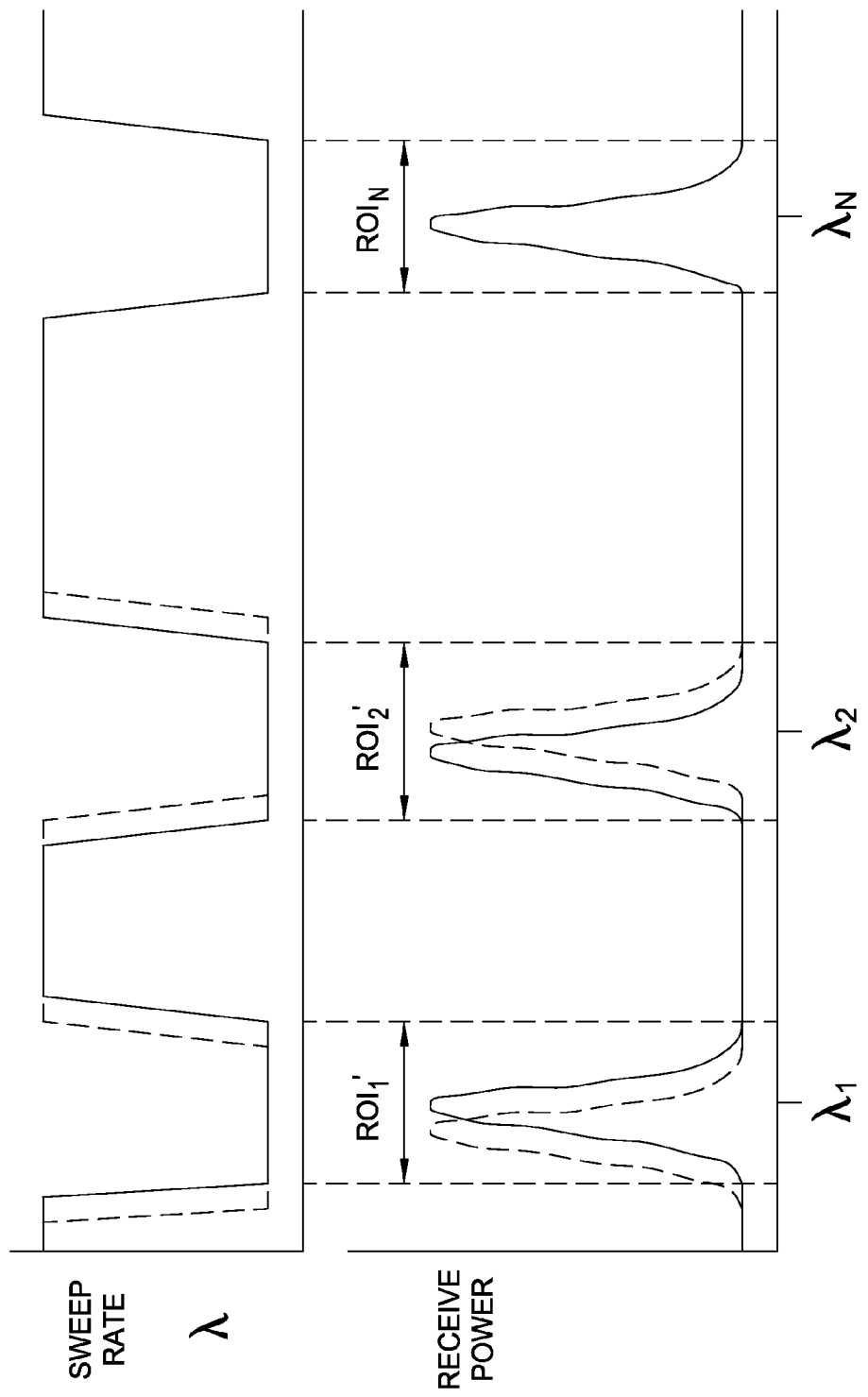
FIG. 5 illustrates how wavelength features of interest may shift over time and how sweep rates of corresponding wavelength regions may be adjusted accordingly.

For example, as illustrated in FIG. 5, the characteristic wavelength of a first sensor (λ1) may change over time, such that the region of interest, defined by the expected deviation in wavelength of the sensor, may shift over time. A previous region of interest is shown as a dashed line, while the new region of interest is shown as a solid line. In the illustrated example, a positive shift for λ1 is shown. As illustrated in the upper graph of FIG. 5, in response to this shift, the wavelength sweep control 140 may adjust the corresponding swept range (swept with a relatively low sweep rate and/or a relatively high optical power) for λ1 to compensate for the shift. As illustrated, the characteristic frequency for a second sensor (λ2) may shift in the opposite direction, which may cause the wavelength sweep control 140 to adjust the corresponding swept range accordingly.

Figure 6:
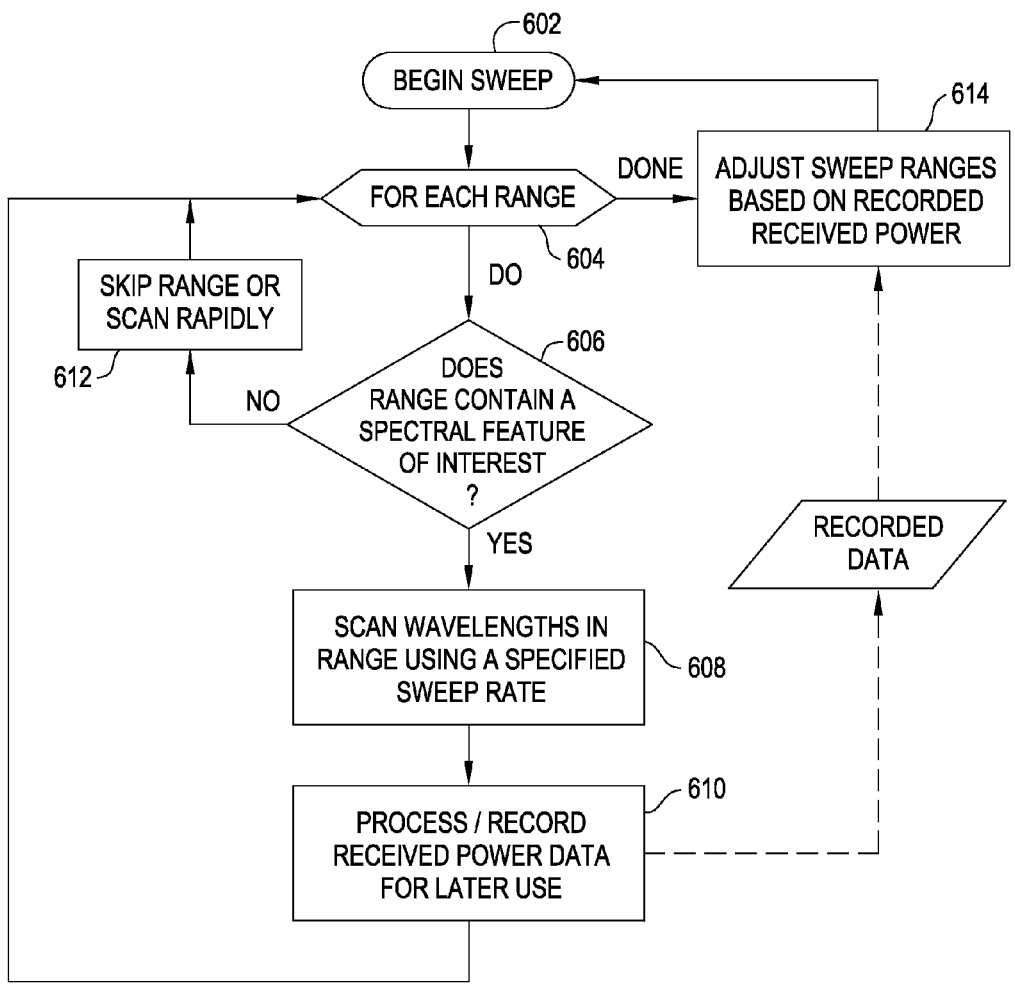
FIG. 6 is a flow diagram of exemplary operations for varying wavelength sweep parameters based on feedback from previous sweeps.

FIG. 6 is a flow diagram of exemplary operations that may be performed, for example, by the wavelength sweep control 140 to vary wavelength sweep parameters based on feedback from previous sweeps. At step 602, a sweep begins, for example by interrogating optical elements with light signals having a wavelength at a low end of a total range to be swept. As described above, the total range to be swept may be divided into ranges (e.g., ranges of interest and deadbands).

At step 604, a loop of operations is entered, to be performed for each range. At step 606, a determination is made as to if a current range contains a spectral feature of interest. If the current range does not contain a spectral feature of interest, the range can be skipped or, at least, scanned rapidly, at step 612. If the current range contains a spectral feature of interest, wavelengths in the range may be swept at a specified (relatively slow) sweep rate, at step 608. At step 610, the received power (response signal) may be recorded for later use.

The operations may be repeated (e.g., slowly sweeping ranges of interest and rapidly sweeping deadbands), until all ranges have been swept. At step 614, the swept ranges may be adjusted based on the recorded received power, for example, as described above with reference to FIG. 5. These adjusted swept ranges may then be used in a subsequent sweep. In this manner, the wavelength sweep control 140 may continuously adjust sweep parameters to compensate for changing sensor characteristics.

Figure 7:
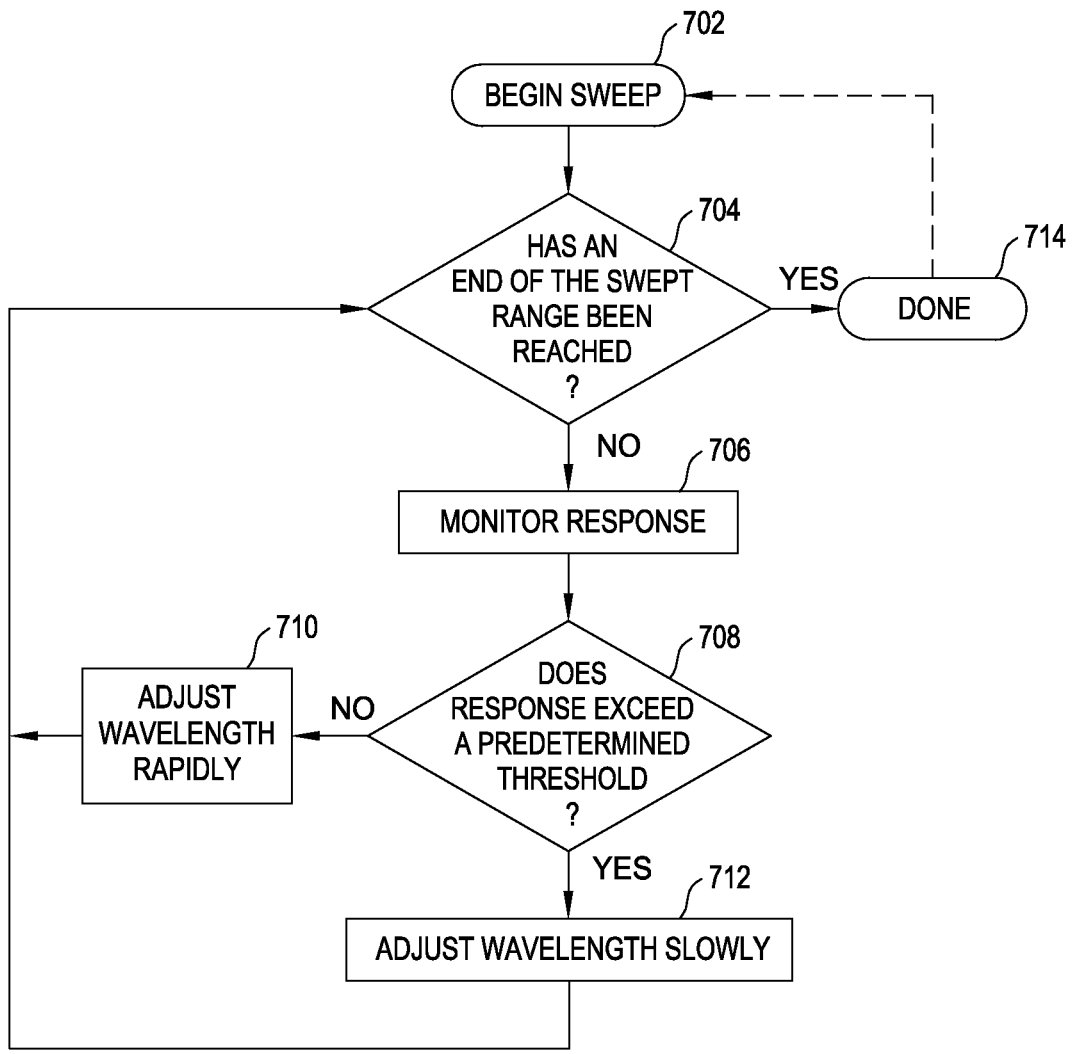
FIG. 7 is a flow diagram of exemplary operations for varying wavelength sweep parameters of a current sweep based on feedback.

FIG. 7 is a flow diagram of exemplary operations for varying wavelength sweep parameters of a current sweep based on feedback. The operations shown in FIG. 7 may be performed to sweep without using predefined sweep ranges, for example, by sweeping rapidly until some level of response signal is detected indicating a sensor region of interest has been reached. As an alternative, the operations of FIG. 7 may be performed with predefined sweep ranges, for example, in an effort to detect spectral information occurring in what was thought to be a deadband.

At step 702, a sweep begins. At step 706, the optical response is monitored. As long as the response does not exceed a predetermined threshold, as determined at step 708, the wavelength is adjusted rapidly. Once the response does exceed the predetermined threshold, the wavelength is adjusted slowly. These operations may repeat, until the end of a swept range has been reached, as determined at step 704. Thus, these operations may allow regions that contain no spectral feature of interest (as evidenced by a lack of response signal) to be quickly scanned.

Figure 8:
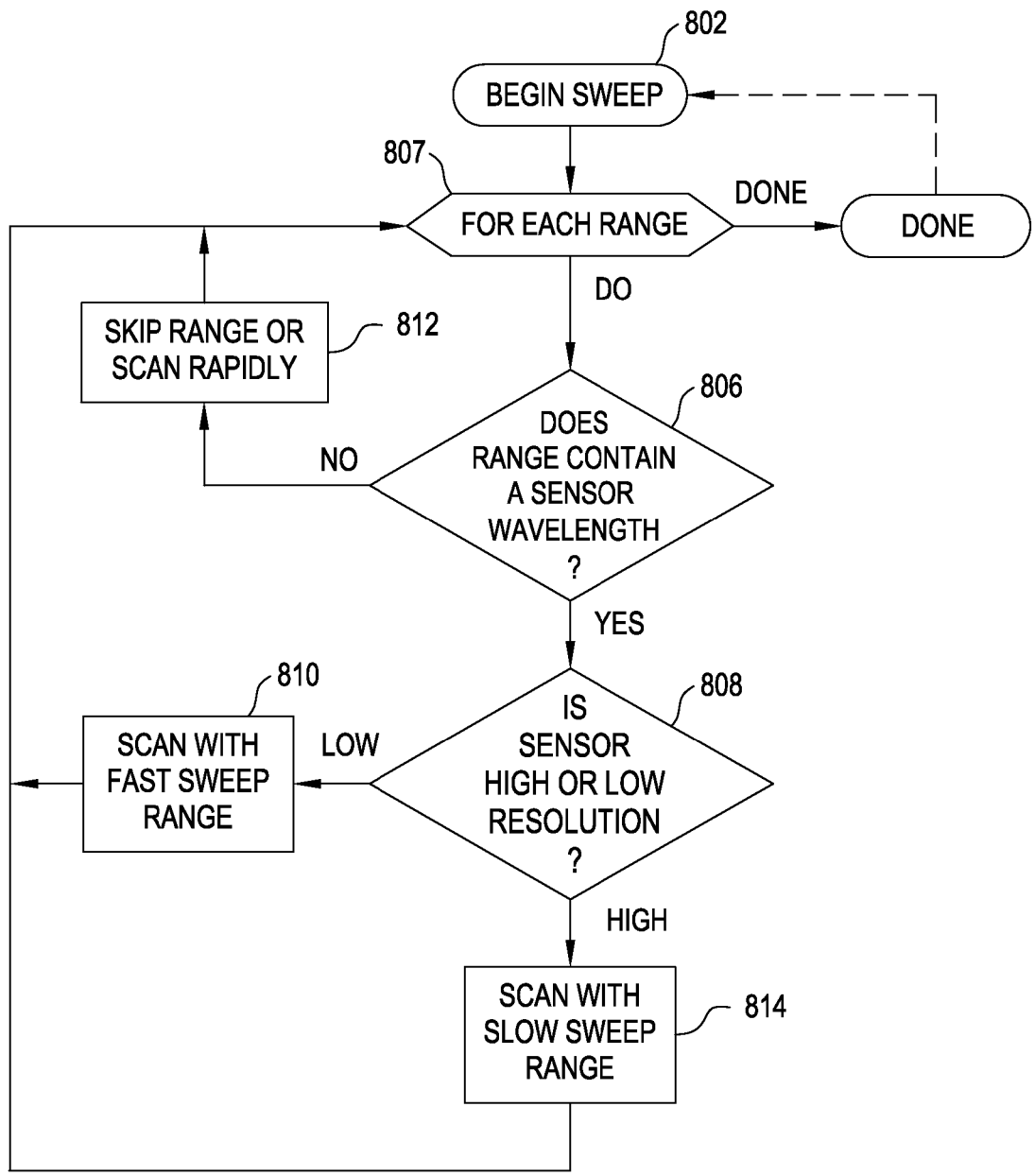
FIG. 8 is a flow diagram of exemplary operations for varying sweep rates based on specified sensor resolutions.

FIG. 8 is a flow diagram of exemplary operations for varying sweep rates based on specified sensor resolutions. As previously described, some sensors may be identified as high resolution sensors that may be scanned slower (allowing more samples to be taken) or that may be scanned with interrogating signals having higher optical power. Other sensors, identified as low resolution sensors may be scanned more rapidly (although not as quickly as a deadband) or that may be scanned with interrogating signals having relatively lower optical power.

At step 802, a sweep begins and, at step 804, a loop of operations is entered, to be performed for each range. At step 806, a determination is made as to if a current range contains a characteristic wavelength of a corresponding sensor. If the current range does not contain a sensor wavelength, the range can be skipped or, at least, scanned rapidly, at step 812. If the current range contains a sensor wavelength, a determination is made, at step 808, as to whether the corresponding sensor is a high or low resolution sensor.

If the sensor is a low resolution sensor, the range may be scanned with a relatively fast sweep range (but slower than that used to sweep a deadband), at step 810. If the sensor is a high resolution sensor, the range may be scanned with a relatively slow sweep range, at step 814. The operations may be repeated until all ranges have been swept.

Figure 9:
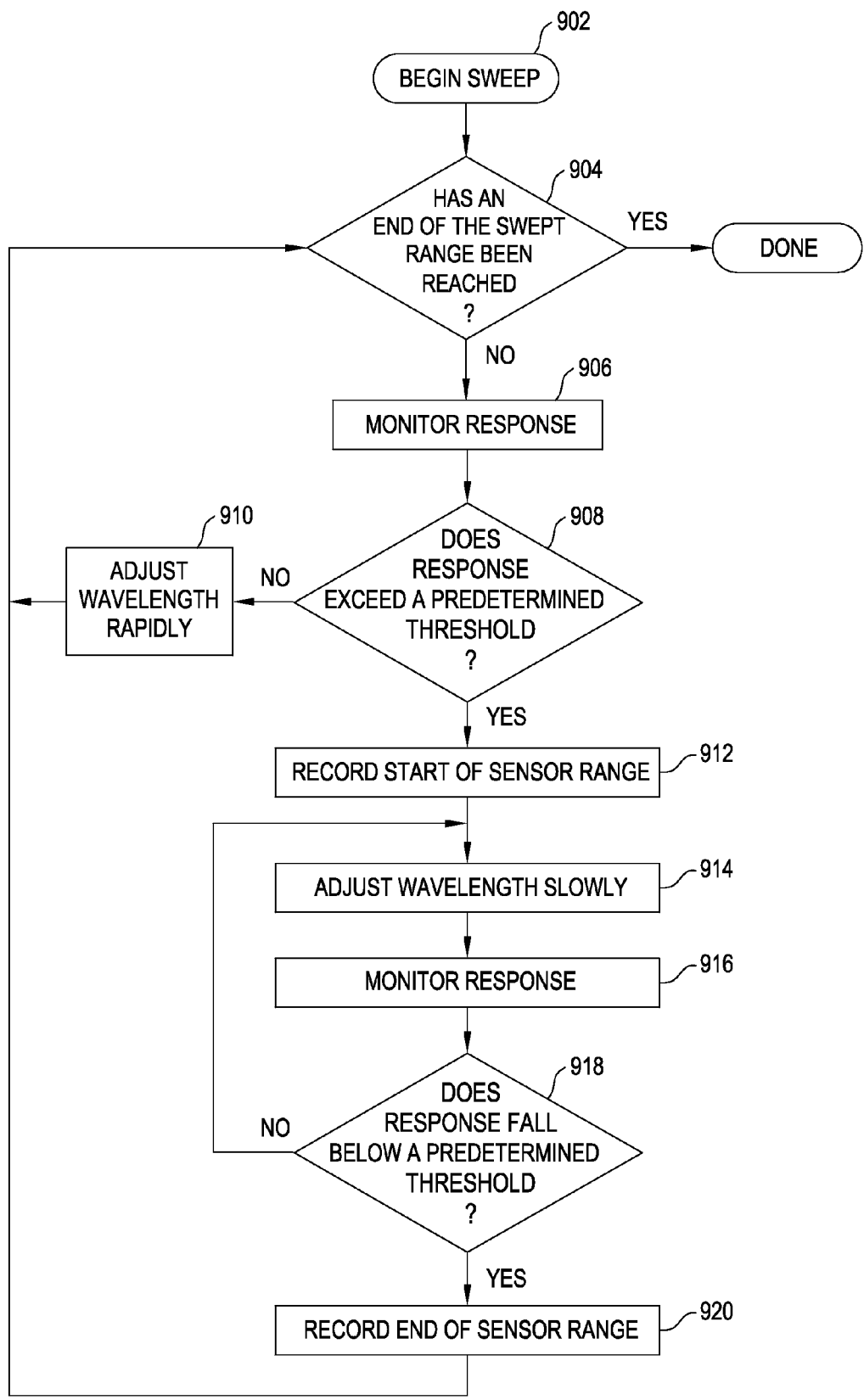
FIG. 9 is a flow diagram of exemplary operations for automatically discovering a sensor topology during a sweep of a range of wavelengths.

FIG. 9 is a flow diagram of exemplary operations for automatically discovering a sensor topology during a sweep of a range of wavelengths. The operations may be performed, for example, as an initial operation to determine the types of sensors that are present in an optical system without requiring field personnel to enter corresponding data manually. In some cases, sensor vendors may sell sensors with known characteristic wavelengths (or wavelength ranges), allowing corresponding data to be pre-stored in the system. In such cases, if the characteristic wavelengths are automatically detected during a sweep, it may be a simple matter of looking up the actual device characteristics, such as the response changes in wavelength as a function of a corresponding measurand (e.g., pressure, temperature, strain, and the like).

At step 902, a sweep of a wavelength range begins. At step 904, a determination is made as to if the end of the range has been reached. If not, the optical response is monitored (or continues to be monitored), at step 906. At step 908, if the monitored response does not exceed a predetermined threshold (e.g., indicating the absence of a characteristic wavelength at or near the current swept wavelength), the wavelength may be adjusted rapidly, at step 910.

On the other hand, if the monitored threshold exceeds a predetermined threshold (e.g., indicating a characteristic wavelength at or near the current swept wavelength), the start of a sensor range may be recorded, at step 912. Because the current wavelength may be at or near a characteristic sensor wavelength, the wavelength may be adjusted slowly, at step 914, while continuing to monitor the optical response, at step 916. The sensor range may include all wavelengths for which the monitored response remains above the predetermined threshold. If the monitored response falls below the predetermined threshold (in some cases allowing for some amount of hysteresis), as determined at step 918, the end of the sensor range may be recorded, at step 920. The operations may be repeated until the entire range has been swept.

Those skilled in the art will also recognize that different aspects described herein may be combined, for some embodiments. As an example, for some embodiments, wavelength sweep control logic may be configured to perform different combinations of operations shown in the flow diagrams described above, to provide different combinations of features.

While the foregoing is directed to embodiments of the present invention, other and further embodiments of the invention may be devised without departing from the basic scope thereof, and the scope thereof is determined by the claims that follow.

The invention claimed is:

1. A method, comprising:
    obtaining feedback from one or more optical sensor elements generated using a sweep of wavelengths to interrogate optical sensor elements, wherein the optical sensor elements have characteristic wavelengths spanned by a sweep range, wherein the characteristic wavelengths change in response to features sensed by the optical sensor elements, and wherein the feedback regards the changes to the characteristic wavelengths; and
    adjusting one or more parameters effecting the interrogation, during a current or future sweep, based on the feedback, wherein the adjusting comprises:
        decreasing an interrogating optical power if the sweep range does not contain a spectral feature of interest; and
        increasing the interrogating optical power if the sweep range contains a spectral feature of interest.

2. The method of claim 1, wherein adjusting one or more parameters affecting the interrogation comprises adjusting a sweep rate of one or more sweep ranges.

3. The method of claim 1, wherein adjusting one or more parameters affecting the interrogation comprises adjusting one or more sweep ranges to track a shift in a characteristic wavelength of one or more of the optical elements.

4. An apparatus for controlling interrogation of optical sensor elements having characteristic wavelengths spanned by a sweep range, comprising:
    circuitry for obtaining feedback from the optical sensor elements generated using a sweep of wavelengths to interrogate the optical sensor elements, wherein the characteristic wavelengths change in response to features sensed by the optical sensor elements and wherein the feedback regards the changes to the characteristic wavelengths; and
    circuitry for adjusting one or more parameters affecting the interrogation, during a current or future sweep, based on the feedback, wherein the circuitry for adjusting is configured to:
        decrease an interrogating optical power if the sweep range does not contain a spectral feature of interest; and
        increase the interrogating optical power if the sweep range contains a spectral feature of interest.

5. The apparatus of claim 4, wherein the circuitry for adjusting one or more parameters affecting the interrogation comprises circuitry for adjusting a sweep rate of one or more sweep ranges.

6. The apparatus of claim 4, wherein the circuitry for adjusting one or more parameters affecting the interrogation comprises circuitry for adjusting one or more sweep ranges to track a shift in a characteristic wavelength of one or more of the optical elements.

7. A method comprising:
    obtaining feedback from one or more optical sensor elements generated using a sweep of wavelengths to interrogate the optical sensor elements, wherein the optical sensor elements have characteristic wavelengths spanned by a sweep range, wherein the characteristic wavelengths change in response to features sensed by the optical sensor elements, and wherein the feedback regards the changes to the characteristic wavelengths; and
    adjusting one or more parameters affecting the interrogation, during a current or future sweep, based on the feedback, wherein the adjusting comprises decreasing a sweep rate of the sweep range when one of the optical sensor elements having the characteristic wavelengths in the sweep range is a high resolution sensor.

8. An apparatus for controlling interrogation of optical sensor elements having characteristic wavelengths spanned by a sweep range, comprising:
    circuitry for obtaining feedback from the optical sensor elements generated using a sweep of wavelengths to interrogate the optical sensor elements, wherein the characteristic wavelengths change in response to features sensed by the optical sensor elements and wherein the feedback regards the changes to the characteristic wavelengths; and
    circuitry for adjusting one or more parameters affecting the interrogation, during a current or future sweep, based on the feedback, wherein the circuitry for adjusting is configured to decrease a sweep rate of the sweep range when one of the optical sensor elements having the characteristic wavelengths in the sweep range is a high resolution sensor.

* * * * *

UNITED STATES PATENT AND TRADEMARK OFFICE
CERTIFICATE OF CORRECTION

PATENT NO.        : 8,552,360 B2
APPLICATION NO.   : 11/755131
DATED             : October 8, 2013
INVENTOR(S)       : Domino Taverner et al.

Page 1 of 1

It is certified that error appears in the above-identified patent and that said Letters Patent is hereby corrected as shown below:

In the Claims:

Column 7, Claim 1, Line 49, insert --the-- after interrogate;

Column 7, Claim 1, Line 56, delete "effecting" and insert --affecting-- therefor.

Signed and Sealed this
Fourth Day of February, 2014

Michelle K. Lee
*Deputy Director of the United States Patent and Trademark Office*